(12) United States Patent
Van Winkelen et al.

(10) Patent No.: US 6,395,177 B1
(45) Date of Patent: May 28, 2002

(54) PROCESS AND APPARATUS FOR DECOLORING LIQUIDS AND WATER PRODUCT THEREOF

(75) Inventors: Jacobus Cornelis Van Winkelen, Leeuwarden; Walterus Gijsbertus Joseph Van Der Meer, Sneek, both of (NL)

(73) Assignee: N.V. Waterleiding Friesland, Leeuwarden (NL)

( * ) Notice: Subject to any disclaimer, the term of this patent is extended or adjusted under 35 U.S.C. 154(b) by 0 days.

(21) Appl. No.: 09/485,281

(22) PCT Filed: Aug. 5, 1998

(86) PCT No.: PCT/NL98/00451
§ 371 (c)(1),
(2), (4) Date: Jun. 15, 2000

(87) PCT Pub. No.: WO99/07643
PCT Pub. Date: Feb. 18, 1999

(30) Foreign Application Priority Data

Aug. 8, 1997 (NL) .............................. 1006753

(51) Int. Cl.⁷ .............................. C02F 1/78; C02F 3/12
(52) U.S. Cl. .................. 210/622; 210/626; 210/627; 210/631; 210/638; 210/760; 210/192; 210/195.2; 210/195.3; 210/196
(58) Field of Search ................. 210/620, 621, 210/622, 626, 627, 631, 638, 650, 760, 192, 195.1, 195.2, 195.3, 196, 202, 259

(56) References Cited

U.S. PATENT DOCUMENTS

| | | | | |
|---|---|---|---|---|
| 3,748,262 A | * | 7/1973 | Lee et al. .................. | 210/760 |
| 3,945,918 A | * | 3/1976 | Kirk .......................... | 210/760 |
| 4,073,722 A | * | 2/1978 | Grutsch et al. ............ | 210/631 |
| 4,178,239 A | * | 12/1979 | Lowther ..................... | 210/631 |
| 4,765,900 A | * | 8/1988 | Schwoyer et al. .......... | 210/631 |
| 5,271,830 A | * | 12/1993 | Faivre et al. ............... | 210/202 |
| 5,302,288 A | * | 4/1994 | Meidl et al. ................ | 210/626 |
| 5,308,492 A | * | 5/1994 | Loew et al. ................ | 210/631 |
| 5,746,920 A | * | 5/1998 | Boergardts et al. ........ | 210/631 |
| 6,113,787 A | * | 9/2000 | Czermak et al. ........... | 210/631 |
| 6,146,532 A | * | 11/2000 | Troesch ..................... | 210/626 |

FOREIGN PATENT DOCUMENTS

DE           19527295     *   6/1996

OTHER PUBLICATIONS

Knoblock et al, "Membrane Biological Reactor System for Treatment of Oily Wastewaters" Water Environment Research, Mar./Apr. 1994, vol. 66, No. 2, pp 133–139.*

* cited by examiner

Primary Examiner—Christopher Upton
(74) Attorney, Agent, or Firm—Seed Intellectual Property Law Group PLLC

(57) ABSTRACT

The invention relates to a method for decoloring liquids, in particular ground water, by means of a membrane filtration unit, wherein the following steps are carried out: i) subjecting the ground water to a biological treatment in a bioreactor; ii) feeding the effluent from the bioreactor of step i) to the membrane filtration unit, in which membrane filtration unit a separation between biomass and decolored ground water takes place; followed by iii) feeding back the biomass from step ii) to the bioreactor. The invention also relates to decolored ground water and to a device for decoloring liquids.

25 Claims, 1 Drawing Sheet

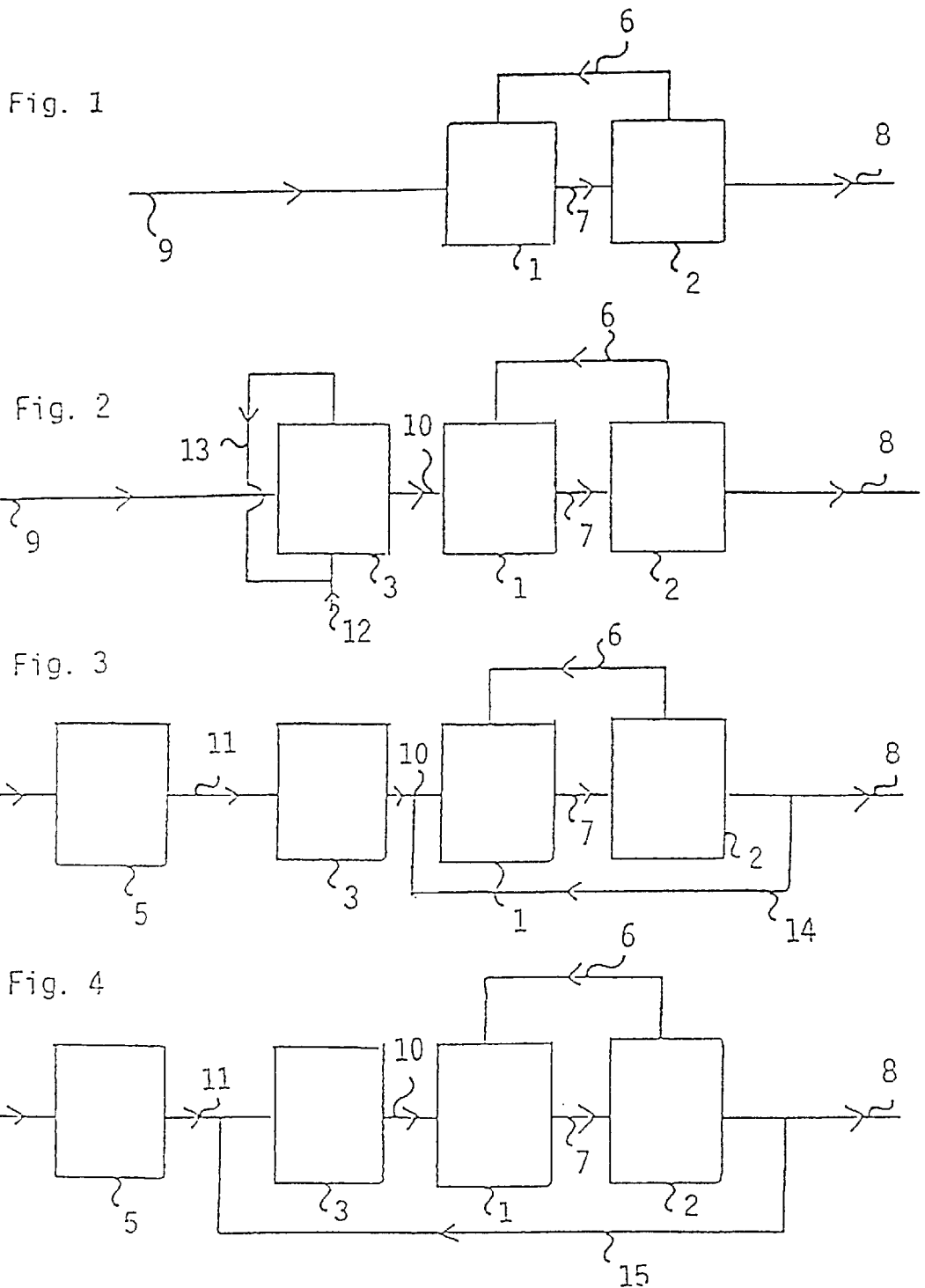

PROCESS AND APPARATUS FOR DECOLORING LIQUIDS AND WATER PRODUCT THEREOF

BACKGROUND OF THE INVENTION

The present invention relates to a method for decoloring liquids, in particular ground water. The present invention furthermore relates to a device for decoloring liquids, in particular ground water, by using such a method, as well as to decolored ground water which has been obtained by using the method according to the present invention.

In practice a number of processes for decoloring ground water exist, namely adsorption on active carbon and membrane filtration. The process of adsorption on active carbon comprises a bed of active carbon, through which the water to be decolored is passed with a residence time of about 10–30 minutes, after which a product flow is obtained from which the colour has been removed. One drawback of such a process is the fact that in practice the filter bed of active carbon is already saturated within a month. The saturated active carbon must then be removed from the filter bed and be returned to the supplier, where the saturated bed material is regenerated by means of steam into active carbon, which can be reused in the filter bed. Since the application of such necessary regeneration operations interferes with a continuous operation, it is usual in practice to connect a number of filter beds in series, so that a continuous operation is ensured. Another drawback of decoloring ground water by using active carbon is the fact that the ground water generally contains certain organic-substances which, if they bond to active carbon, form an ideal seed-bed for bacteria and higher organisms, for example worms. As a result of this luxuriant growth, especially the bacteriological quality of the ground water leaving the filter bed of active carbon will decrease. In addition, the presence of said higher organisms in the distribution network may lead to problems.

Another process for decoloring ground water consists of membrane filtration. The advantage of such membrane filtration on a nano filtration scale (pore size: 0.01–0.001 micron) is the fact that in addition to the removal of the colour, also substances such as iron and manganese can be removed. One drawback of such membrane filtration is the high energy consumption, namely about 0.5 kWh per $m^3$ of purified water. Another major drawback is the fact that 10–20% of the ground water to be decolored leaves the process in the form of a waste flow (concentrate flow). In connection with the possible scarcity of ground in the future it is desirable, therefore, not to waste any ground water.

SUMMARY OF THE INVENTION

The object of the present invention is to avoid the aforesaid problems of the known processes for decoloring ground water.

In addition to that it is desirable that a method be developed which is capable of processing, in a continuous manner, ground water of varying composition, in particular of a varying colour intensity, into decolored ground water which also has a high bacteriological quality, that is, which is in principle free from bacteria and viruses.

Another object of the invention is to provide a device for decoloring liquids which requires small capital investments and which enables a high production rate of decolored liquids.

The method as referred to in the introduction is according to the present invention characterized in that the following steps are carried out:

i) subjecting the ground water to a biological treatment in a bioreactor;

ii) feeding the effluent from the bioreactor of step i) to a membrane filtration unit, in which membrane filtration unit a separation between biomass and decolored ground water takes place; followed by iii) feeding back the biomass from step ii) to the bioreactor;

whereby the ground water is subjected to an oxidation treatment in an oxidation reactor prior to carrying out step i).

Although the term ground water will consistently be used in the description below, it should be understood that besides ground water, also surface water, process water and industrial water can be processed by using the method according to the present invention.

Such a method for biologically purifying waste water, whereby the waste water to be purified is biologically treated in a reactor and the effluent from the reactor is fed to a membrane unit connected after said reactor, is known per se from German Offenlegungsschrift 195 27 295. According to the method described therein, a propellant is fed to the membrane unit, as a result of which the concentrate is fed back to the reactor and the filtrate is withdrawn from the membrane unit by means of a vacuum. Such a method requires a complicated plant consisting of a reactor, a membrane filtration unit, a propellant compressor and a vacuum pump. In addition, the plant is unsuitable for processing waste water flows of considerably different compositions.

Although an aerobic biological reactor connected to ultra-filters is known from the article "Membrane biological reactor system for treatment of oily wastewater", Knobloc et al., Water Environment Research, 66 (1994) March/April, edition 2, Apr. 3, 1994, pages 133–139, it is not known from said publication to decolor liquids, in particular ground water, by using a method wherein an oxidation treatment, a biological treatment and a membrane filtration separation are successively carried out.

By subjecting the ground water to a biological treatment in a bioreactor, the organic substances present in the ground water will be converted into water and carbon dioxide by bacteria, after which the ground water that has been treated in the bioreactor and the bacteria present therein are carried to a membrane filtration unit. The pore size of the membrane filtration unit is selected such that the biomass, that is, the bacteria, do not pass through the membrane, whilst the ground water treated in the bioreactor will diffuse through the membrane of the membrane filtration unit. Then the biomass is withdrawn from the membrane filtration unit and returned to the bioreactor. According to such a method conversion of organic substances takes place in the bioreactor, after which the suspension of biomass and biologically treated ground water is separated into decolored ground water and biomass in the membrane filtration unit. In particular embodiments it is preferred to discharge a part of the amount of biomass to be returned to the bioreactor. Since the liquid to be treated has in principle been freed from bacteria and viruses already by the membrane filtration unit, a liquid having a high biological quality is thus obtained.

The determination of the colour intensity takes place in accordance with Dutch standard NEN 6413, which document may be considered to be incorporated herein. According to this document, the colour intensity of water is indicated by the number of mg of platinum which must be added in the form of potassium chloroplatinate to 1 liter of colourless water in order to give said water the same colour intensity as the water to be examined. A content of less than 5 mg of Pt/Co/1 is indicated as colourless.

The present applicants have carried out extensive research with regard to the colour intensity of water, and they have found that the presence of humic acids or humic acid compounds has a significant influence thereon. Consequently, they propose the following theory, whereby it should be understood that they are by no means bound thereby. Said research has shown that the colour of the ground water is mainly caused by the presence of humic acids or humic acid compounds. The term humic acid is understood to mean organic compounds having complex structures built up of several benzene-like six-membered nuclei having a molecular weight of at least 1000 Dalton or higher. Although the bacteria present in the bioreactor are capable of decomposing such humic acids or humic acid compounds into smaller organic compounds, eventually water and $CO_2$, such a conversion will take place slowly in practice. By first subjecting the ground water to an oxidation treatment in accordance with the method according to the present invention, the humic acids or humic acid compounds present in the ground water, in addition to the other organic compounds, will be decomposed into smaller organic fractions, which fractions will subsequently be converted into water and $CO_2$ relatively quickly in the bioreactor by the biomass that is present. Thus it is possible according to the present invention to decolor liquids, in particular ground water, in an efficient manner.

The oxidation treatment in the oxidation reactor is preferably carried out by using ozone that is injected. It is preferred to capture the unused amount of ozone in the oxidation reactor, and subsequently reintroduce it into the oxidation reactor so as to minimize the amount of ozone that is being used. Although the oxidation treatment is preferably carried out by means of ozone, it is also possible to use another suitable oxidation agent, for example a hydrogen peroxide solution or a permanganate solution, or another oxidation method, for example an enzymatic method. One drawback of using a hydrogen peroxide solution is the fact that it is not possible in practice to feed back hydrogen peroxide solution, and that too high a dose of hydrogen peroxide leads to disadvantageous conditions for the biomass present in the bioreactor.

In another embodiment it is preferred to subject the pumped-up ground water to a treatment for removing iron, manganese, ammonia and constituents which cause the hardness of the liquid to be treated in accordance with a usual method before subjecting the ground water to an oxidation treatment and/or a biological treatment. Such a pre-treatment is only necessary if it is to be expected that iron and/or manganese flocks will be formed during the oxidation treatment in the oxidation reactor, which flocks have an adverse effect on the membrane filtration unit, in particular by clogging the pores.

In a preferred embodiment of the method according to the present invention, the decolored ground water from step ii) is partially returned to the bioreactor. An embodiment such as this one is used in particular if the colour intensity of the ground water that has already been biologically treated is insufficient.

In another preferred embodiment of the method according to the present invention, the decolored ground water from step ii) is partially returned to the oxidation reactor. An embodiment such as this one is used in particular if the colour intensity of the ground water that has already been biologically treated has been reduced to an insufficient degree, for example due to the remaining presence of humic acids or humic acid compounds. When the already insufficiently decolored ground water is subjected to the oxidation treatment in the oxidation reactor anew, the humic acids or humic acid compounds that are still present will be decomposed into smaller organic fractions as yet, which fractions will then be converted in the bioreactor into the compounds water and $CO_2$, which do not cause any colouration.

If it is observed in practice that the colour intensity of the ground water that has been treated already is still undesirably high, it is also possible to increase the residence time in the oxidation reactor and/or in the bioreactor, in order to decrease the colour intensity as yet.

Since a suspension of ground water and biomass is present in the bioreactor, it is desirable to provide a maximum contact area between the biomass and the compounds to be decomposed that are present in the ground water. Said keeping in suspension is preferably carried out by supplying air to the bioreactor, whereby it should be noted, however, that the bioreactor may be provided with a stirring apparatus. The air that is supplied moreover has an advantageous influence on the living conditions of the biomass that is present in the bioreactor. In addition to that it is preferred to create an optimum environment for the bacteria in the bioreactor, so that the conversion into non-colouring organic fractions will take place as quickly as possible. Carboniferous nutrients, in particular acetate compounds, may be fed to the bioreactor, if desired. In order to obtain advantageous conditions for the biomass, it is furthermore preferred for the pH-value in the bioreactor to range from 6–10, in particular from 7–9.

The contents of the bioreactor are then fed to a membrane filtration unit, as described in step ii), whereby the pore size of the membrane is preferably <0.5 micron, in particular <0.005 micron. The function of the membrane is to effect a separation between biomass and treated ground water, whereby the dimension of the biomass determines the critical pore size of the membrane. The dimensions of bacteria generally range from 0.5–3 micron, so that the desired pore size of the membrane is <0.5 micron, preferably <0.005 micron. Another advantage of using a pore size of <0.005 micron is that no ion particles, which may be objectionable, will remain in the decolored ground water.

In another preferred embodiment of the method according to the invention, it is preferred to use a residence time in the oxidation reactor of maximally 600 seconds. A residence time of more than 600 seconds requires a large oxidation reactor or a small volume flow through the oxidation reactor, which aspects are both undesirable in practice.

The residence time in the bioreactor is preferably one hour at most. A residence time in the bioreactor of more than one hour requires the use of large bioreactors and/or low flow rates, which is undesirable in practice.

The temperature of the liquid to be decolored, in particular ground water, is not critical, but it preferably ranges between 0° C. and 60° C. A temperature below 0° C. leads to icing, which renders pumping of the liquid flows impossible, and a temperature above 60° C. will cause the bacteria which are present in the bioreactor to die. In practice the ground water that is pumped up will have a temperature of about 10° C., and said temperature will not change during the carrying out of the method for decoloring ground water. For particular embodiments it may be desirable, however, to change the temperature of the liquid to be decolored, in particular to the temperature at which the biological conversion in the bioreactor takes place optimally.

The present invention furthermore relates to a device for decoloring liquids, in particular ground water, by using the method according to the present invention. The device according to the present invention, which comprises a bioreactor and a membrane filtration unit connected in series thereto, which device is provided with the necessary supply and discharge pipes and pumps, whereby the membrane filtration unit is also connected to the bioreactor via a return pipe for biomass, is characterized in that an oxidation reactor is disposed before the bioreactor, whereby the outlet of the oxidation reactor is connected to the inlet of the bioreactor.

The oxidation reactor is furthermore preferably provided with a supply pipe for ozone and with a discharge pipe for unused ozone, which discharge pipe is connected to the supply pipe for ozone. In this manner ozone is used optimally. In a particular embodiment of the present invention, it is preferred to have a pre-treatment unit disposed before the oxidation reactor, whereby the outlet of the pre-treatment unit is connected to the inlet of the oxidation reactor. One or more means for removing iron, manganese, ammonia and/or constituents which cause the hardness of the liquid to be treated may be mentioned as suitable pre-treatment units. Such a pre-treatment unit may be provided with return pipes.

In addition to that it is preferred in certain embodiments for a return pipe to be provided in the discharge pipe for decolored ground water from the membrane filtration unit, which return pipe is connected to the bioreactor. According to such a construction, it is possible to feed back the ground water that has not been decolored sufficiently to the bioreactor, whereby the biological treatment in said bioreactor leads to further decomposition of the organic constituents that impart the ground water its colour into the eventual constituents water and carbon dioxide, which do not impart colour.

In certain embodiments it is preferred however, for a return pipe to be provided in the discharge pipe for decolored ground water from the membrane filtration unit, which return pipe is connected to the oxidation reactor. Any ground water that has not been decolored sufficiently is thus returned to the oxidation reactor, in which oxidation reactor the organic constituents that are still present in the ground water are converted into smaller organic constituents, which smaller organic constituents -are then converted into water and carbon dioxide in the bioreactor.

The pore size of the membrane in the device according to the present invention is determined by the size of the biomass to be separated, which biomass generally has a dimension ranging from 0.5–3 micron. The preferred pore size of the membrane is less than 0.5 micron, therefore, in particular less than 0.005 micron.

A suspension of biomass and ground water is present in the bioreactor, and in order to prevent said biomass from settling, the bioreactor is preferably provided with an air supply pipe. It is also possible, however, to provide the bioreactor with a stirring apparatus, whereby it is preferred in some cases to provide the bioreactor with an air supply pipe and with such a stirring apparatus.

Although it is stated in the above description that a preferred embodiment of the device comprises a return pipe for decolored ground water to the bioreactor on the one hand and to the oxidation reactor on the other hand, it is also possible, of course, to split the return pipe for decolored ground water from the membrane filtration unit into a pipe which is connected to the inlet of the bioreactor and a pipe which is connected to the inlet of the oxidation reactor. Such an embodiment is used in particular if the volume of the individual oxidation reactor and that of the individual bioreactor are insufficient for processing the total amount of decolored ground water that is to be returned. The determination of the ratio between the amount to be returned to the bioreactor and the amount to be returned to the oxidation reactor can take place in a simple manner by a person who is skilled in this field.

BRIEF DESCRIPTION OF THE DRAWINGS

The present invention will be discussed in more detail hereafter with reference to the appended drawings, whereby it should be noted that the present invention is by no means limited to special embodiments such as the ones that are described herein.

FIG. 1 is a diagrammatic representation of a prior art device for treating liquids.

FIG. 2 diagrammatically shows the device according to the present invention for decoloring liquids, in particular ground water.

FIG. 3 diagrammatically shows a special embodiment of a device for decoloring liquid, in particular ground water, according to the present invention, wherein a return pipe is provided in the discharge pipe for decolored ground water from the membrane filtration unit, which return pipe is connected to the bioreactor.

FIG. 4 diagrammatically shows a special embodiment of a device for decoloring liquid, in particular ground water, according to the present invention, wherein a return pipe is provided in the discharge pipe for decolored ground water from the membrane filtration unit, which return pipe is connected to the oxidation reactor.

DESCRIPTION OF THE PREFERRED EMBODIMENTS

In FIG. 1 the liquid to be treated is fed, via pipe 9, to bioreactor 1, in which biomass is present. The effluent from bioreactor 1 is fed to membrane filtration unit 2 via pipe 7, in which membrane filtration unit 2 a separation between biomass and treated liquid takes place. The biologically treated liquid is discharged from membrane filtration unit 2 via pipe 8, and the amount of biomass that has been separated in membrane filtration unit 2 is fed back to bioreactor 1 again via return pipe 6.

It should be noted that like elements are indicated by like numerals in the respective FIGS. 1–4.

FIG. 2 diagrammatically shows the device of FIG. 1, wherein the ground water being supplied via pipe 9, which has a particular undesirable colour, is first subjected to an oxidation treatment in oxidation reactor 3, however, before the ground water thus treated is fed to bioreactor 1 via pipe 10. Oxidation reactor 3 is provided with a suitable oxidation means, which oxidation means is preferably ozone, which is fed to oxidation reactor 3 via pipe 12. The unused ozone in oxidation reactor 3 is then fed to oxidation reactor 3 again via pipe 13. It is also possible, however, to feed the amount of ozone to oxidation reactor 3, via pipe 12, in such a manner that all the ozone in oxidation reactor 3 is used, so that it will not be necessary to provide return pipe 13. The oxidated ground water leaves oxidation reactor 3 via pipe 10, after which it is fed to bioreactor 1. The effluent from bioreactor 1 is fed to membrane filtration unit 2 via pipe 7, in which membrane filtration unit 2 a separation between biomass and decolored ground water takes place. The decolored ground water is discharged from membrane filtration unit 2 via pipe 8, and the separated amount of biomass is fed to bioreactor 1 again via return pipe 6 for biomass.

FIG. 3 shows a preferred embodiment of the device according to the present invention, wherein ground water pumped up via pipe 9, which has a particular undesirable colour, is first pre-treated in pre-treatment space 5, after which the ground water thus pre-treated is fed to oxidation reactor 3 via pipe 11. A pre-treatment which is frequently used in practice comprises the removal of iron, manganese, ammonia and constituents which cause the hardness of water. Although it is indicated in FIG. 3 that the ground water thus pre-treated is first fed to oxidation reactor 3, via pipe 11, before it is fed to bioreactor 1, it is desirable in particular embodiments, however, to feed the ground water that has been pre-treated in pre-treatment space 5 directly to bioreactor 1, so that no oxidation treatment takes place in oxidation reactor 3. FIG. 3 furthermore shows an embodiment wherein pipe 8 for discharging decolored ground water is furthermore provided with a return pipe 14 for decolored ground water, which pipe 14 is connected to pipe 10, which functions as an inlet for bioreactor 1. Practice has shown that in some cases the colour in the ground water has disappeared to an insufficient degree, which means that the decolored ground water must be decolored anew, for example by connecting return pipe 14 for decolored ground water to the inlet of bioreactor 1. Thus, the insufficiently decolored ground water is subjected anew to a biological treatment in bioreactor 1. The process flows round bioreactor 1 and membrane filtration unit 2 correspond with those described with reference to FIGS. 1 and 2. Although FIG. 3 shows the combination of a pre-treatment space 5 and a return pipe 14 for decolored ground water, it should be apparent that both aspects can be applied independently of each other.

FIG. 4 shows a preferred embodiment of the device according to the present invention, which is different from the device of FIG. 3 as regards the aspect of the feeding back of decolored ground water. In FIG. 4 a return pipe 15 for decolored ground water is provided in pipe 8, which return pipe 15 is connected to pipe 11, which pipe 11 functions as an inlet to oxidation reactor 3. If the colour intensity of the ground water being discharged from membrane filtration unit 2 is insufficient, the insufficiently decolored ground water will be subjected anew to an oxidation treatment in oxidation reactor 3 via return pipe 15 by connecting return pipe 15 to pipe 11. Although the pumped-up ground water is subjected to a pre-treatment in pre-treatment space 5 via pipe 9 in FIG. 4r it is also possible not to carry out such a pre-treatment. Moreover, the device of FIG. 4 is not limited to the combination of return pipe 15, pre-treatment space 5 and oxidation reactor 3. After all, in particular embodiments it is desirable not to apply the pre-treatment in pre-treatment space 5, and to feed the strongly coloured ground water and the already insufficiently decolored ground water jointly to oxidation reactor 3 via pipe 9 and return pipe 15 respectively. The process flows round bioreactor 1 and membrane filtration unit 2 correspond with those discussed above with reference to FIGS. 1–3. Although the oxidation reactor 3 of FIGS. 3–4 is not provided with a supply pipe 12 for ozone and with return pipe 13 for unused ozone, the devices which are shown diagrammatically in FIGS. 3–4 are not limited thereto.

In addition to that it will be apparent to those skilled in the art that the decoloring capacity of the device according to the present invention can be increased by arranging one or more oxidation reactors, bioreactors and/or membrane filtration units in series. Furthermore it is possible to process liquids of varying origin jointly in the device according to the present invention.

What is claimed is:

1. A method for decoloring ground water, surface water, process water or industrial water by means of a membrane filtration unit, comprising the following steps:

i) subjecting the water to a biological treatment in a bioreactor;

ii) feeding the effluent from the bioreactor of step i) to the membrane filtration unit, in which membrane filtration unit a separation between biomass and decolored water takes place;

iii) feeding back the biomass from step ii) to the bioreactor;

whereby the water is subjected to a chemical oxidation treatment in an oxidation reactor prior to carrying out step i).

2. The method according to claim 1, wherein the water is subjected to a treatment for removing iron, manganese, ammonia and/or constituents which cause the hardness of the water to be treated prior to carrying out step i).

3. The method according to claim 1, wherein the water is first subjected to a treatment for removing iron, manganese, ammonia and/or constituents which cause the hardness of the water to be treated, then subjecting the water to a chemical oxidation treatment in the oxidation reactor, after which the water thus treated is fed to step i).

4. The method according to claim 1, wherein the oxidation treatment is carried out by injecting ozone into the oxidation reactor.

5. The method according to claim 4, wherein ozone which has not been used up during the oxidation treatment is fed back to the oxidation reactor.

6. The method according to claim 1, wherein the decolored water from step ii) is partially returned to the bioreactor.

7. The method according to claim 1, wherein the decolored water from step ii) is partially returned to the oxidation reactor.

8. The method according to claim 1, wherein air is fed to the bioreactor.

9. The method according to claim 1, wherein carboniferous nutrients are fed to the bioreactor.

10. The method according to claim 1, wherein the pH-value in the bioreactor ranges from 6–10.

11. The method according to claim 1, wherein the pore size of the membrane which is used in the membrane filtration unit is <0.5 micron.

12. The method according to claim 11, wherein the pore size is <0.005 micron.

13. The method according to claim 1, wherein the residence time in the oxidation reactor is maximally 600 seconds.

14. The method according to claim 1, wherein the residence time in the oxidation reactor is maximally one hour.

15. The method according to claim 1, wherein the temperature of the water to be decolored ranges from 0–60° C.

16. A device for decoloring ground water, surface water, process water or industrial water, which device comprises a membrane filtration unit and a bioreactor, which is connected in series to the membrane filtration unit, provided with the necessary supply and discharge pipes and pumps, whereby the membrane filtration unit is also connected to the bioreactor via a return pipe for biomass, and further comprising a chemical oxidation reactor disposed before the bioreactor, whereby the outlet of the oxidation reactor is connected to the inlet of the bioreactor.

17. The device according to claim 16, wherein a pre-treatment unit is disposed before the oxidation reactor, whereby the outlet of the pre-treatment unit is connected to the inlet of the oxidation reactor.

18. The device according to claim 17, wherein one or more means for removing iron, manganese, ammonia and/or constituents which cause the hardness of the water to be treated are used as the pre-treatment unit.

19. The device according to claim 16, wherein a return pipe is provided in the discharge pipe for decolored water from the membrane filtration unit, which return pipe is connected to the bioreactor.

20. The device according to claim 16, wherein a return pipe is provided in the discharge pipe for decolored water from the membrane filtration unit, which return pipe is connected to the oxidation reactor.

21. The device according to claim 16, wherein the pore size of the membrane in the membrane filtration unit is <0.5 micron.

22. The device according to claim 21, wherein the pore size of the membrane in the membrane filtration unit is <0.005 micron.

23. The device according to claim 16, wherein the oxidation reactor is provided with a supply pipe for ozone and with a discharge pipe for unused ozone, which discharge pipe is connected to the supply pipe for ozone.

24. The device according to claim 16, wherein the bioreactor is provided with a pipe for supplying air.

25. The device according to claim 16, wherein the bioreactor is provided with a stirring apparatus.

* * * * *